United States Patent [19]

Broockman et al.

[11] Patent Number: 4,717,818
[45] Date of Patent: Jan. 5, 1988

[54] BAR CODE LABEL IDENTIFICATION CIRCUIT

[75] Inventors: Eric C. Broockman, Raleigh; Olen L. Stokes, Jr., Cary, both of N.C.

[73] Assignee: International Business Machines Corporation, Armonk, N.Y.

[21] Appl. No.: 878,758

[22] Filed: Jun. 26, 1986

[51] Int. Cl.[4] .............................................. G06K 7/10
[52] U.S. Cl. ..................................... 235/462; 235/463
[58] Field of Search ................................. 235/462, 463

[56] References Cited

U.S. PATENT DOCUMENTS 4,329,574 5/1982 Jordan .................................. 235/463

Primary Examiner—Harold I. Pitts
Attorney, Agent, or Firm—Gerald R. Woods

[57] ABSTRACT

A method for forming UPC or EAN bar code labels from scans of half labels or less than half labels requires that captured data be examined and classified as being either a first type of data configuration or a second type. A first type includes a given number of numeric characters delimited by both margin and center characters. A second type includes either a margin character or a center character and a given number of numeric characters. Labels are formed, where possible, by using appropriate first type data configurations. If labels cannot be formed using only first type configurations, second type configurations are examined to determine if they could represent different portions of the same region (left or right) of a label. If complementary second type configurations are found, they are merged to form a half label. The formed half label may be further merged with a complementary first type data configuration to form a complete label.

5 Claims, 18 Drawing Figures

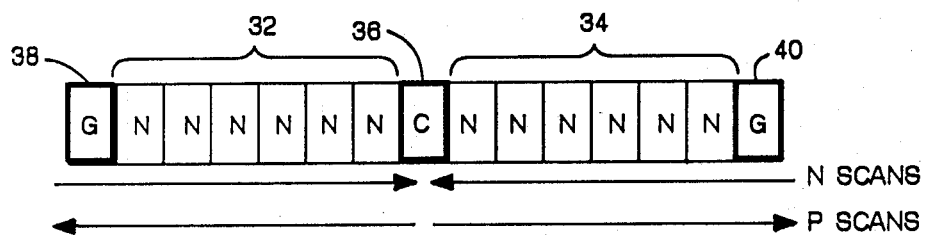
FIG. 2
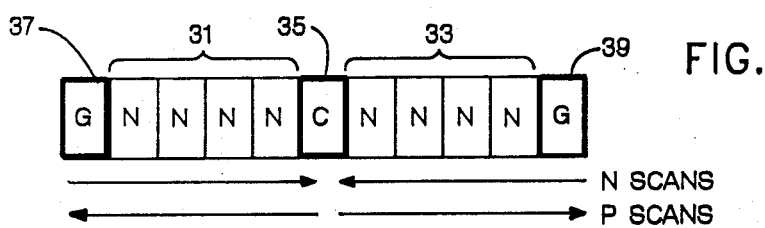
FIG. 3
FIG. 4
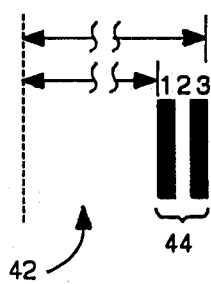
FIG. 5
FIG. 6
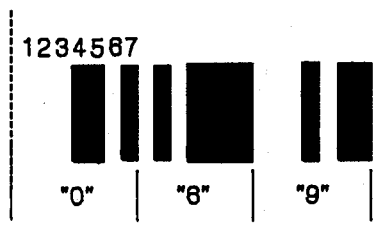

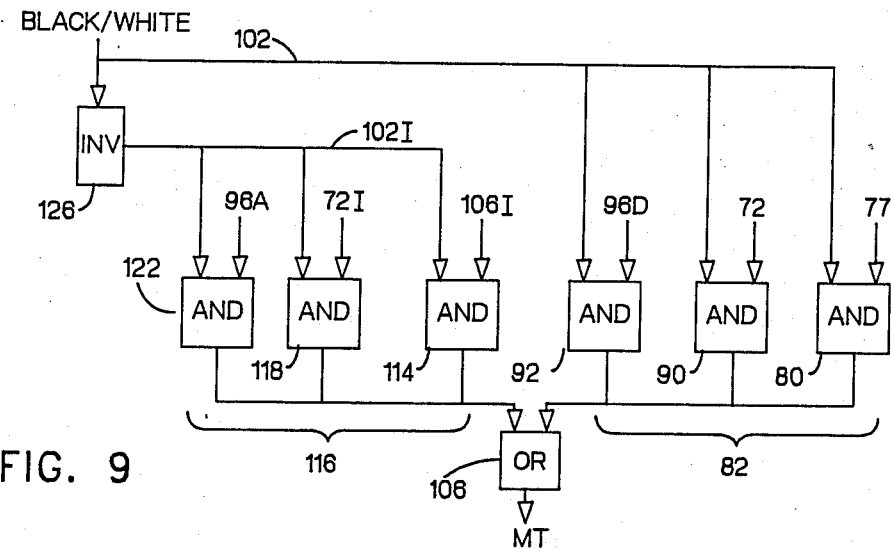
FIG. 9
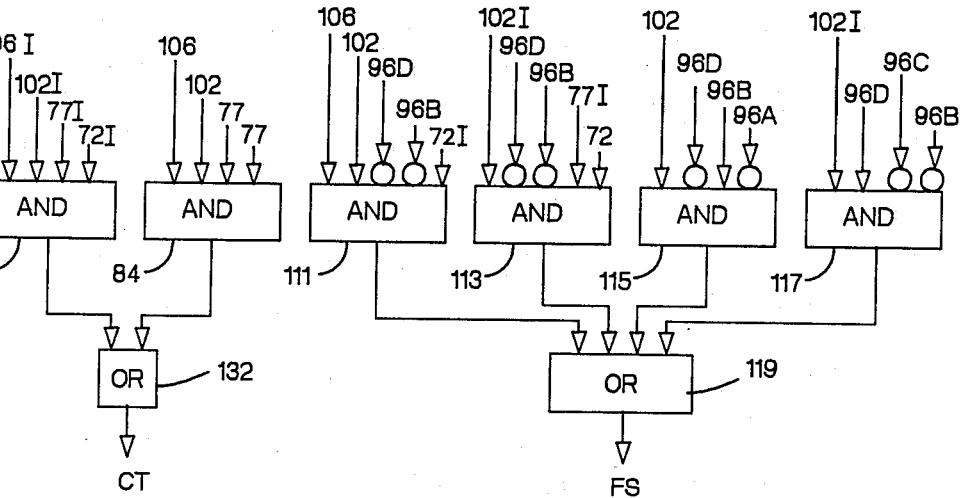

| | PARITY | | | | TYPE |
|---|---|---|---|---|---|
| M | 0 | 0 | 0 | 0 | L1 |
| M | 0 | 0 | E | 0 | L1 |
| M | 0 | 0 | E | E | L1 |
| M | 0 | E | 0 | 0 | L1 |
| M | 0 | E | E | 0 | L1 |
| M | 0 | E | E | E | L1 |
| M | 0 | E | 0 | E | L1 |
| M | E | E | E | E | R4 |

| | PARITY | | | | TYPE |
|---|---|---|---|---|---|
| 0 | 0 | 0 | 0 | C | L2 |
| 0 | 0 | E | E | C | L2 |
| 0 | E | 0 | E | C | L2 |
| 0 | E | E | 0 | C | L2 |
| E | 0 | 0 | E | C | L2 |
| E | 0 | E | 0 | C | L2 |
| E | 0 | E | E | C | L2 |
| E | E | 0 | 0 | C | L2 |
| E | E | 0 | E | C | L2 |
| E | E | E | 0 | C | L2 |
| E | E | E | E | C | R3 |

BAR CODE LABEL IDENTIFICATION CIRCUIT

TECHNICAL FIELD

The present invention relates to bar code scanners and more particularly to a circuit for identifying and forming a label using a stream of raw data provided by a scanner.

PRIOR ART

A significant problem in scanning randomly oriented bar code labels, such as Universal Product Code (UPC) or European Article Number (EAN) labels, on grocery products is locating or identifying the label. The box or container on which the label appears will generally have a relatively large amount of printed matter adjacent the label. When the scanner beam traverses the printed matter, code-like signals will be generated by the scanner. All of the signals presented by the scanner must be analyzed to determine which represent bar code label signals and which represent extraneous background signals.

Known techniques for isolating label signals from extraneous background signals are disclosed and claimed in U.S. Pat. Nos. 3,909,787 and 4,329,574, both of which are assigned to the assignee of the present invention.

Both patents describe techniques for testing raw data to determine possible combinations of the various characters which can appear in a label meeting UPC or EAN character standards; namely, numeric characters, center characters and guard characters. While the techniques described in the two patents differ from one another, what they have in common is a requirement that a stream of data be found to include a guard character, numeric characters and a center character before it will be considered a label candidate.

In a number of situations, a scan line may not cross both a guard character and a center character. The scan line may pick up a guard character and several numeric characters but not the center character. Similarly, the scan line may pick up the center character and several numeric characters but not a guard character. In the candidate selection circuits described in the referenced patents, data produced by any such scan would be discarded and would not be used in identifying label candidates.

SUMMARY OF THE INVENTION

The present invention is a bar code label identification system which can detect partial label configurations consisting of center or guard characters with adjacent numeric characters and which can form complete labels using such partial label configurations.

The system is to be used to decode a label of the type that includes, at least in part, a plurality of numeric characters delimited by standard guard characters and a standard center character. The system can form complete label candidates using data captured by plural scans of the label where no scan traverses both the guard character and a center character. Means are included for examining captured data to determine whether adjacent characters have specified relative characteristics. Means are also included for generating a first condition flag when examining means indicates the presence of a guard character and at least $N/2 +1$ adjacent characters where N is the number of numeric characters delimited by the guard character and the center character. Means are further included for generating a second condition flag when the captured data includes a center character and at least $N/2+1$ adjacent numeric characters. Decoding means are included for decoding numeric characters occupying given label positions to generate a third condition flag when the same decoded value is found in corresponding given positions. Finally, means are included for producing a label candidate if the first, second and third conditions have been satisfied.

BRIEF DESCRIPTION OF THE DRAWINGS

While the specification concludes with claims particularly pointing out and distinctly claiming that which is regarded as the present invention, the details of a preferred embodiment of the invention may be more readily ascertained from the following technical description when read in conjunction with the accompanying drawings, wherein:

FIG. 2 is a schematic layout of a UPC version A or EAN-13 label showing the relative location of different types of characters in this label format;

FIG. 3 is a schematic layout of an EAN-8 label showing the relative location of different types of characters in this label format;

FIG. 4 depicts the guard character used in labels such as those represented in FIGS. 2 and 3;

FIG. 5 depicts the center character used in such labels;

FIG. 6 represents three sequential numeric characters;

FIG. 9 is a schematic diagram of another portion of the candidate select circuit and is to be viewed as an extension of FIG. 7;

FIG. 13 is a schematic representation of a UPC-E (or partial UPC-A or EAN-13) and EAN-8 labels showing different scan lines crossing portions of the labels;

TECHNICAL DESCRIPTION

Figure 1:
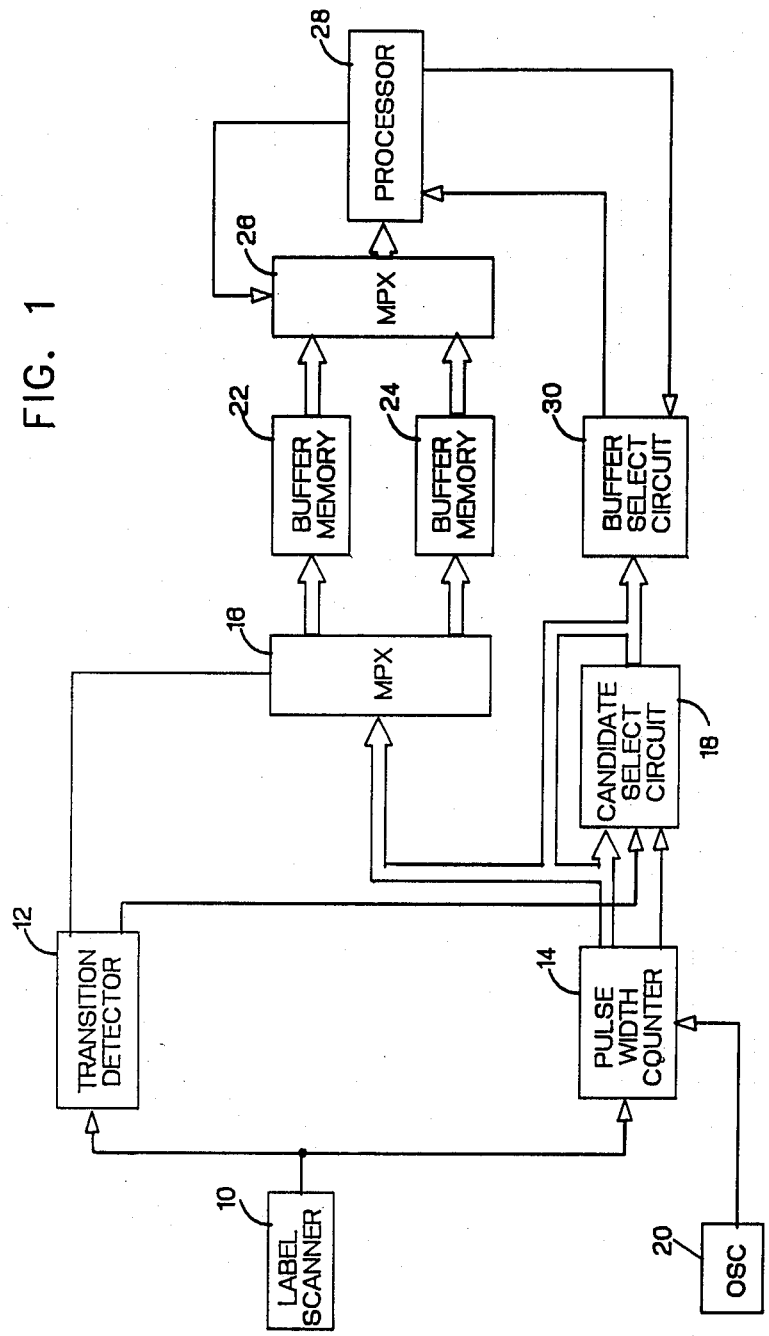
FIG. 1 is a simplified block diagram of a label reading system including a label identification system constructed in accordance with the present invention.

Referring to FIG. 1, one type of label reading system in which the present invention may be used includes a label scanner 10 for detecting optical or magnetic indicia on a surface being scanned. As a matter of convenience, it will be assumed that scanner 10 is an optical scanner which provides an analog signal having an amplitude which varies inversely to the reflectance of the portion of the surface being scanned. Label scanner 10 is assumed to include threshold and signal-shaping circuits which convert the analog signal to a square wave pulse train in which each pulse has a duration determined by the length of a light or dark area being scanned. The output of label scanner 10 is applied to a transition detector 12 and to a pulse width counter 14. Transition detector 12 provides a brief pulse at the leading edge at each positive and negative pulse in the square wave pulse train. The pulses are used for timing the transfer of data through a 1 to 2 parallel multiplexer 16 and a candidate select circuit 18, which will be described in more detail later.

The function of the pulse width counter 14 is to measure the width of each positive (bar) and negative (space) pulse in the square wave pulse train generated by scanner 10. Pulse width counter 14 may be a conventional counter which is driven by a constant frequency oscillator 20. The oscillator output is used to increment one or more counter devices with each counter being gated on at the leading edge of a pulse and gated off at the trailing edge of the pulse. The accumulated count is proportional to the duration of the pulse. The output of pulse width counter 14 is a multi-bit signal or word which is presented in parallel both to the multiplexer 16 and to the candidate select circuit 18. Pulse width words are shifted through multiplexer 16 and candidate select circuit 18 in synchronism. At any given time, multiplexer 16 delivers pulse width words to one of two parallel buffer memories 22, 24. Concurrently, the contents of the other buffer are transferred through a 2 to 1 parallel demultiplexer 26 to a processor 28. The data transfer into and out of the buffer memory 22 and 24 is under the control of a buffer select circuit 30. The details of the buffer memories and multiplexer circuits are not essential to an understanding of the present invention and are not described in this specification.

The function of a candidate select circuit is to recognize pulse patterns or configurations which might represent labels or portions of labels in the train of pulses generated by label scanner 10. When such patterns or configurations are detected in candidate select circuit 18, framing signals are generated. The framing signals are merged with the stream of pulse width words transmitted to multiplexer 16 from pulse width counter 14 to locate or frame the detected configuration in this stream. The framing signals are also applied to buffer select circuit 30, for use in controlling the connections between multiplexer 16 and the buffer memories 22 and 24.

FIG. 2 depicts one type of label which might be recognized by a candidate select circuit constructed in accordance with the present invention. The label includes twelve bar-coded numeric characters N segregated into a left hand set 32 and a right hand set 34. The numeric characters represent values in the range 0-9.

The left and right hand sets 32 and 34 are separated by center character 36. Center character 36 has no numeric value but serves to delimit the numeric character sets and to provide information needed to establish the direction in which the label is scanned. Guard characters 38 and 40 are provided at the left and right ends of the label. The guard characters are also used as numeric character delimiters and to establish scan direction. Bar code labels having this format are identified as UPC Version A (UPC-A) labels in the United States or EAN-13 labels in many European countries. UPC-A and EAN-13 labels differ only slightly. In fact, the right halves of either type of label may be identically encoded. The left halves differ in that certain parity patterns are allowable for each type of label. The term "parity pattern" and the allowable parity patterns are discussed below.

As a matter of convention, any scan which begins at a guard character and extends toward the center character is defined as an N scan. Any scan which extends from the center character toward one of the guard characters is defined as a P scan.

FIG. 3 depicts another type of label which might be detected by the candidate select circuit. This label, identified as an EAN-8 label, contains eight numeric characters, segregated into a left set 31 and a right set 33. The two sets of numeric characters are separated by a center character 35 and are bounded by guard characters 37 and 39.

Referring to FIG. 4, each margin region includes an wide light space 42 separating printed matter from a guard character or bar-space-bar combination 44. The bars and space in combination 44 are of equal width. The actual width of any one bar or space will vary as a function of the overall label size. For purposes of decoding the label, it can be said that each bar and each space is one module wide. No maximum acceptable width is specified for light space or margin 42. A minimum acceptable width of 5 modules is established by UPC and EAN standards.

Conventionally, the guard character is considered to be the bar-space-bar combination 44. As will be explained in more detail later, a candidate select circuit constructed in accordance with the present invention assumes a margin character consisting of the combination 44 plus the space 42.

FIG. 5 shows the center character structure. The center character includes three spaces and two interleaved bars. All of the bars and spaces have a standardized width of one module. For purposes of candidate selection, the last space in the direction of scan may be ignored in the candidate select circuit using the present invention. That is, if the center character were being scanned from left to right, the candidate select circuit would make use only of spaces 1 and 3 and bars 2 and 4 in the center character.

Each numeric character is made up of two bars and two alternating spaces. In a given label, every numeric character has the same physical width. Expressed in terms of modules, each numeric character is seven modules wide. Individual bars may be one to four modules in width while individual spaces may be one to three modules in width. FIG. 6 illustrates UPC characters for the numeric values 0, 6, 9 as those characters are represented in the left hand set of data characters. If a space is characterized as a 0 and a bar as a 1, the binary representation for the seven module data character "0" would be 0001101. Similarly, the binary representation for a symbol representing the number 6 would be 0101111.

If the symbol for a particular number is to be included in the right hand set 34 of the label, the printed symbol is the binary complement of the corresponding symbol in the left hand set. That is, the symbol for the number 0 would be 1110010.

It was stated earlier that UPC-A and EAN-13 labels have the same basic format; i.e., two sets of six numeric characters, guard characters at the left and right edges of the label and a center character in the middle of the label. The two types of labels can be distinguished from one another by the parity pattern of the left half of the label. In a UPC-A label, each numeric character in the left half has odd parity. This means that the total number of modules in the bars in the character is an odd number, either 3 or 5, while the total number of modules making up the spaces is an even number, either 2 or 4. As might be expected, the number of bar modules in a numeric character exhibiting even parity is an even number, either 2 or 4.

In an EAN-13 label, on the other hand, the numeric characters in the left half may exhibit odd or even parity. The mixed parity pattern in an EAN-13 label is used to encode an implicit "13th" character indicating the country in which the product to be sold was made.

To generate a numeric character with even parity for the left half of a label, a normal UPC numeric character is reversed or flipped end for end. The phase of the character is reversed by making what had been bars into spaces and vice versa. For example, the binary character 0001101 would represent the odd parity version of a "6" while 0100111 would represent its even parity version.

There is one other type of UPC label, a Version E label, that needs to be mentioned. A Version E label is like the left half of an EAN-13 label in that it includes a guard character, a center character and six numeric characters which have mixed parity. The allowable parity patterns for a Version E label differ from those for the left half of an EAN-13 label.

It should be noted that a given numeric character which is swept in an N scan begins with a space and ends with a bar. If the same character is scanned in a P scan direction, it appears to begin with a bar and end with a space. This apparent character inversion as a function of the type of scan is taken into account in examining the data within the candidate select circuit 18. The way in which it is taken into account is described in more detail later.

Figure 7:
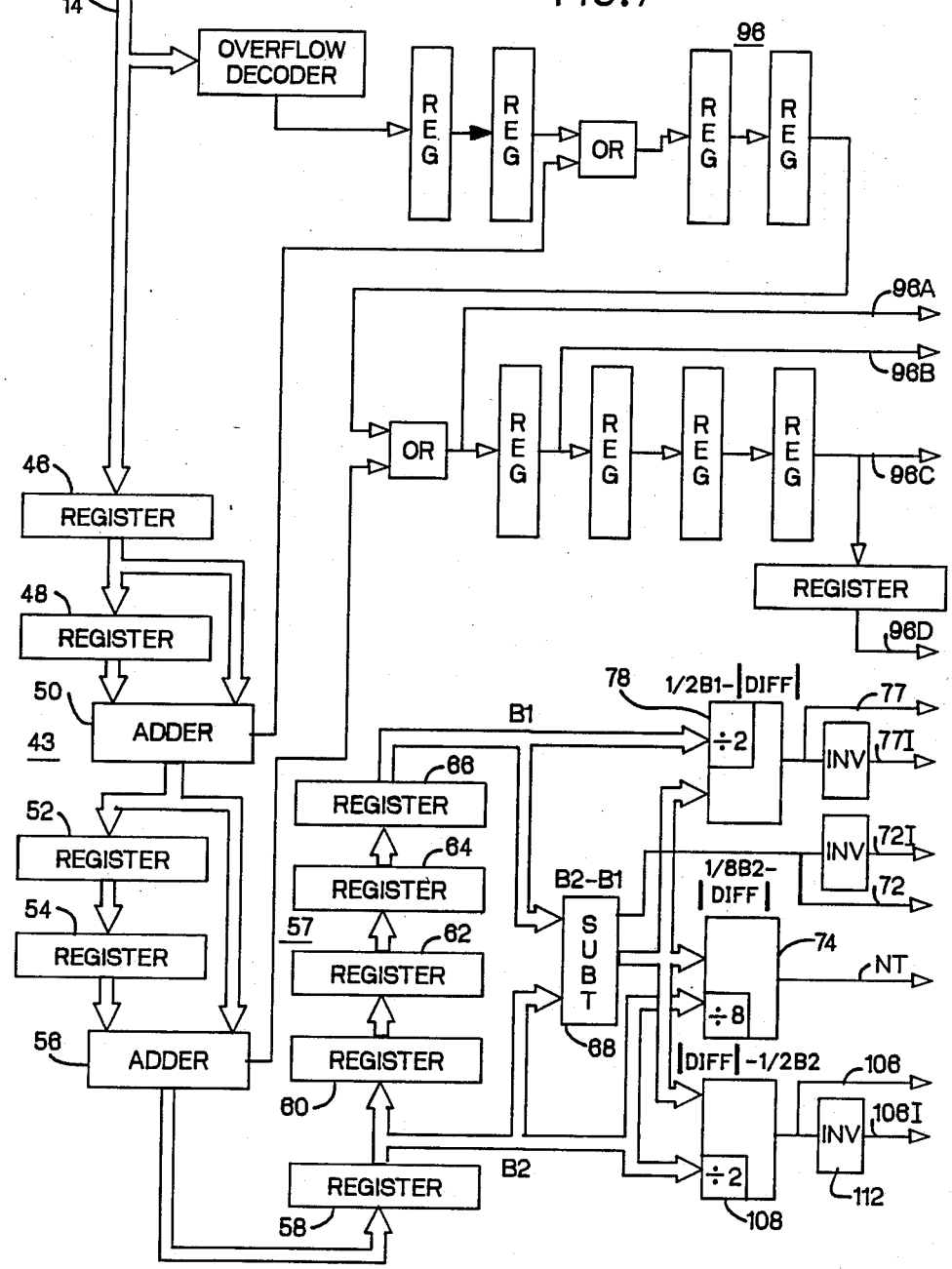
FIG. 7 is a schematic diagram of one portion of a candidate select circuit constructed in accordance with the present invention.

FIG. 7 is a more detailed block diagram of one part of the candidate select circuit shown as box 18 in FIG. 1. Each binary pulse width word generated in pulse width counter 14 is presented in parallel to an accumulator circuit 43 having a first pair of parallel input/output shift registers 46 and 48, a first adder circuit 50, a second pair of parallel input/output shift registers 52 and 54 and a second adder circuit 56. The outputs of registers 46 and 48 are applied in parallel to the adder circuit 50. The output of adder 50 is applied to adder 56 in parallel with the output of register 54. The function of accumulator circuit 43 is to sum the value of four successive value pulse width words provided by pulse width counter 14. The summing is performed on a rolling, overlapping basis. That is, if the letters ABCDEFG represent successive pulse width words generated by counter 14, the output of adder circuit 56 will consist of the following combinations of these words: ABCD, BCDE, CDEF, DEFG, etc.

In terms of label structure, the output of the accumulator circuit 43 represents all of the possible characters which might be formed by any combination of four adjacent bars and spaces. Although successive outputs from accumulator circuit 43 overlap (i.e., share several of the same bars and/or spaces) the actual printed label characters are physically independent of one another and cannot overlap. Before necessary character-to-character comparisons can be performed, the output of the accumulator circuit must be operated on to provide two simultaneous outputs representing contiguous but non-overlapping characters. This function is performed by a circuit including five parallel input/output shift registers 58, 60, 62, 64 and 66 which form a five stage parallel input/output shift register chain 57. The outputs of the last shift register 66 and the first shift register 58 in the chain 57 are compared with one another in the remainder of the circuit to determine whether predetermined relationships exist. From time to time, the output of register 66 may be referred to as a basic unit 1 or B1 signal while the output of register 58 may be referred to as a basic unit 2 or B2 signal.

Figure 8:
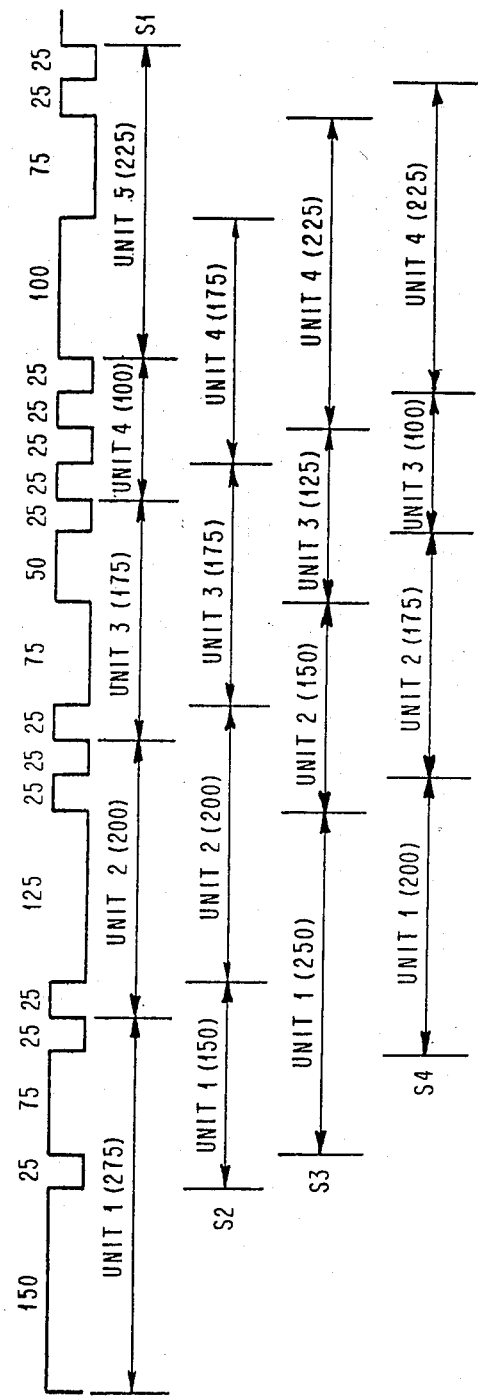
FIG. 8 is a graph of a square wave pulse train and of the stream of the basic unit signals which are generated by processing the train in the circuit described with reference to FIG. 7.

The operations performed by the accumulator circuit 43 and the register chain 57 are represented in FIG. 8. The square wave pulse train shown there is representative of the type of pulse train which might be generated by label scanner 10. The decimal values appearing above the individual pulses are the decimal equivalents of binary values which would be generated by pulse width counter 14. The decimal values have been assigned strictly as a matter of convenience. In practice, the number of counts per pulse would be much higher than the illustrated numbers.

Each of the count values would be applied in succession to the input of accumulator circuit 43. The output of adder 56 in that circuit represents the sum of four successive counts. The first output of adder 56 would be a count of 275 representing unit 1 in data stream S1. The next output from adder circuit 56 would be a count of 150 representing unit 1 in data stream S2. The third output of adder circuit 56 would be a count of 250 (unit 1 in data stream S3) while the fourth output would be a count of 200 representing unit 1 in data stream S4. The fifth output (and every fourth output thereafter) represents a contiguous, non-overlapping basic unit in data stream S1. Similarly, each of the remaining data streams S2, S3 and S4 consists of basic units occurring at every fourth output from the adder circuit 56.

The resulting inputs to the chain 57 can be described as four interleaved data streams, only one of which actually represents the label structure. The register chain 57 "unscrambles" the interleaved data streams so that the remainder of the candidate select logic circuit is able to compare successive non-overlapping basic units in each of the data streams. For example, the first comparison operation would be between units 1 and 2 in stream 1. The second comparison operation would be between units 1 and 2 in stream 2 while the third and fourth comparison operations would involve corresponding units in streams S3 and S4. The fifth comparison operation would involve units 2 and 3 in data stream S1. As will be explained in more detail later, test results for contiguous units in each of the four data streams are recorded independently. The recorded test results indicate which of the data streams is actually representative of the scanned label.

Referring again to FIG. 7, basic unit signals B1 and B2 are applied to a subtractor circuit 68 which generates a first multibit signal on bus 70 representing the absolute difference between B1 and B2. The subtractor circuit 68 also produces a carry signal on line 72. If B1 is greater than B2, line 72 carries a + or binary 1 signal. If B2 is greater than B1, line 72 carries a minus or binary 0 signal.

The absolute difference signal appearing on bus 70 is applied to a first comparator circuit 74. The B2 signal is applied to a second input of comparator 74. The magnitude of the B2 input is scaled down by a factor of 8 within comparator 74 by the conventional expedient of shifting the most significant bit of B2 three places relative to the most significant bit of the absolute difference signal on bus 70. The comparator 74 determines whether $\frac{1}{8}$B2 is greater than the absolute difference between B1 and B2. A positive output from the comparator is an indication that the values of B1 and B2 are substantially equal and therefore might be numeric characters in the UPC label.

Figure 10:
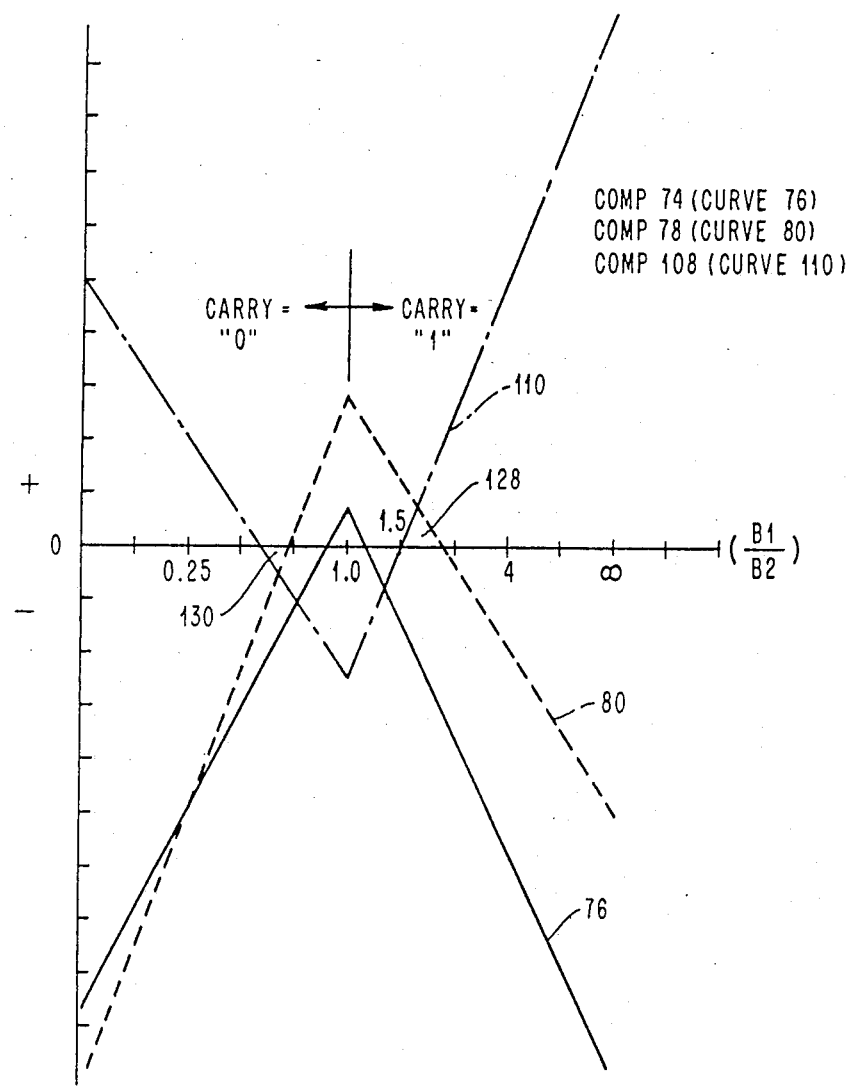
FIG. 10 is a graph of responses of comparator devices shown in the circuit of FIG. 7.

Referring momentarily to FIG. 10, the inverted V-shaped curve 76 shows the response of the comparator 74 as a function of the ratio (B1/B2). The curve 76 shows that the output of comparator 74 is positive (binary 1) only when the ratio of B1/B2 is greater than 0.875 and less than 0.125. For smaller or larger ratios of B1 to B2, the comparator 74 output is a minus or binary 0.

The B1 signal is scaled down by a factor of 2 at one input to a comparator circuit 78. The second input to comparator 78 is the absolute difference signal appearing on bus 70. Comparator 78 is one component in combination of logic elements which test for a possible guard/numeric character relationship between the B1 and B2 signals during an N-type scan. Referring briefly back to FIGS. 4 and 6, a numeric character in a UPC label is always seven modules wide with the modules being allocated between two bars and two spaces. Conventionally, a numeric character is referred to as having a normalized width of seven. The normalized width of a guard character has been conventionally regarded as three; that is, two single-module bars and one single-module space. For purposes of this invention, the white space 42 outside of the conventional character 44 is considered to be part of a "margin" character. UPC standards require that space 42 be at least five modules in width, giving the margin character a minimum normalized width of 8. A successful margin/numeric character test is possible only if B1/B2 is greater than or equal to 8/7.

By solving the equation $0.5B1 - |B1 - B2| = 0$, it can be found that the condition for which comparator 78 actually tests is B1/B2 greater than 0.667 and less than 2.000. If the ratio B1/B2 is within these limits, the output of comparator 78 is a positive or binary 2 signal. Assuming B2 has a normalized width of seven, this means the comparator 78 output is positive for normalized values of B1 in the range of 4.67 to 14. Curve 80 in FIG. 10 depicts the response of comparator 70 in the region of interest. The lower limit of the positive output range of comparator 78 is less than the minimum ideal margin/numeric character ratio of 8 to 7 for a reason. As will be explained in more detail later, the reduced lower limit permits the comparator 78 output to be used in testing for a possible center character in both N-type and P-type scans.

A test for a valid numeric character/margin relationship between successive basic unit signals during a P-type scan is performed in part by a comparator 108. During a P-type scan, basic unit signal B1 would represent the potential numeric character while basic unit signal B2 would represent the adjacent, potential margin character. Comparator 108 compares the absolute difference of B1 and B2 to a signal equal to 0.5 B2. Curve 110 represents the response of comparator 108 for various ratios of B1 to B2.

The output 77 of comparator 78 is applied both to a dual input And gate 80 in a first set 82 of parallel And gates and to a first quad input And gate 84. The output of comparator 78 is also inverted by a conventional inverter amplifier 86, the output 77I of which is connected to a second quad input And gate 88.

One input to an And gate 90 in set 82 is provided by a direct connection to the carry output 72 from subtractor circuit 68. One input to a third And gate 92 in set 82 is provided by a counter overflow register 96 associated with pulse width counter 14. Since the size of the UPC label is small relative to the size of the surface on which it is carried, it can be expected that the surface will have non-label white spaces or bars which, when scanned, yield counts exceeding the finite count capacity of the pulse width counter 14. This is referred to as an overflow condition, which will cause counter 14 will begin counting from 0. Unless the overflow condition is detected and recorded, the output of the counter might be erroneously interpreted as indicating a relatively narrow bar or space when in fact, a considerably wider bar or space was being scanned. An overflow decoder circuit 94 provides a binary 1 signal whenever pulse width counter 14 reaches an overflow condition. This overflow bit is shifted through overflow register 96 in synchronism with the shifting of pulse width words through accumulator circuit 43 and parallel shift register chain 57.

Overflow can also occur in either of the adders 50 and 56 in accumulator circuit 43. For that reason, overflow bits can be inserted in overflow register 96 through OR gates connected to these adders. Overflow register 96 may be considered to be a nine stage serial shift register with output taps after the fourth, fifth, eighth and ninth stages. Any overflow signal generated for a particular pulse width word will reach the outputs from the overflow register at the same time that word reaches the B2 and B1 outputs from the register chain 57. Output 96D from overflow register 96 is applied to one input of And gate 92.

The function of the And gates in set 82 is to detect the various ratios of B1 to B2 which might indicate a margin/numeric character pair during an N type scan. During an N type scan, margin characters and numeric characters always end in a black bar. Therefore, the test for a margin/numeric character pair during an N type scan must be performed when the compared pair of basic unit signals end with bars, i.e., during black bar signals. A black-white input lead 102, connected to the transition detector 12 (FIG. 1), is applied to each of the And gates in set 82 to partially enable those gates at the same time. The black or bar signal on lead 102 is also applied to the quad input And gate 84. Each of the different And gates in set 82 tests for a specific condition which might indicate that a margin/numeric character pair. And gate 80 provides a binary 1 output only where the B1/B2 ratio is between 0.67 and 2.00. As discussed earlier, a potential margin/numeric character pair is indicated by a positive comparator output during the upper half of the range. And gate 90 produces a positive or binary 1 output whenever the signal on carry output 72 indicates that the B1 (potential margin character) signal is equal to or greater than the B2 (potential first numeric character) signal. Finally, And gate 92 produces a binary 1 signal whenever the overflow register 96 indicates that pulse width counter 14, in attempting to establish the value of B1, has actually counted through its maximum capacity. The outputs of the And gates 80, 90, 92 have a common connection 104 to an OR gate 106.

An output 106 of comparator 108 is applied directly to quad input And gate 84 and to an inverter 112. The inverted signal 106I is applied both to quad input And gate 88 and to one input of an And gate 114 in a second set 116 of such gates. A second And gate 118 in the set 116 receives an inverted carry input 72I from a conventional inverter amplifier 120 at the output line 72 from subtractor circuit 68. The third And gate 122 in the set 116 is connected to point 96A in overflow register 96. If the pulse width counter 14 or adders 50 and 56 overflow in counting any of the pulses making up the basic signal B2, line 96A carries a binary 1 signal. A second input 102I to each of the And gates 114, 118, 122 is provided by an inverter amplifier 126, the input to which is connected to the black-white signal line 102.

During a P-type scan, the last modular unit in a numeric character or margin character will be a white space. To test for the presence of margin and numeric characters during such a scan, the black-white signal on lead 102 is inverted to partially enable the And gates in set 116 during each white space. The And gate in the sets 116 perform functions similar to those performed by the And gate set 82. Solving the equation $|B1+B2| - 0.5B2 = 0$ shows that the output of comparator 108 is negative only where the ratio of B1/B2 is between 0.5 and 1.5 in value. Assuming that B1, which represents the numeric character adjacent the margin character in a P-type scan, has a normalized width of seven, And gate 114 will produce a binary 1 at its output when the B2 signal (representing the potential margin character) is greater than 4.67 and less than 14 units in normalized width. And gate 118 will produce a binary 1 signal when B2 is greater than B1. Finally, And gate 122 will produce a binary 1 signal if the width of B2 exceeded the capacity of pulse width counter 14 or one of the adders 50 and 56.

Quad input And gate 84 is used to test for a potentially valid numeric character/center character combinations during an N-type scan. The inputs to quad input And gate 84 are the black signal on line 102, the comparator 78 output signal on line 77, the comparator 108 output signal on line 106 and the carry signal on line 72. The signal on line 102 is high during the scan of each black bar. Referring briefly to FIG. 10, the output of comparators 78 and 108 are both positive for a narrow range of B1/B2 ratios. The range is defined by a small triangular area 128 having lower and upper limits of 1.5 and 2.0, respectively. In an N-type scan, the normalized width of B1, representing the numeric character adjacent the center character, would have a value of seven. Referring briefly to FIG. 5, the UPC center character is conventionally regarded as having a normalized width of five, consisting of three single module spaces and two single module bars. For purposes of this system, the last space in the direction of this scan is ignored giving the center character a normalized width of four. Assuming a normalized B1 value of seven, the conditions defined by triangular area 128 are satisfied whenever the normalized width of B2 is between 3.50 and 4.67. This narrow range of B2 values is roughly centered on the optimal normalized value of 4.0 for a center character during an N type scan.

Quad input And gate 88 tests for a valid center numeric character combinations during a P-type scan. During such a scan, a potential center character would be represented by the B1 signal while the adjacent potential numeric character would be represented by the B2 signal. The quad input And gate 88 receives inverted forms of the same four signals applied to the previously discussed quad input And gate 84. The And gate 88 tests for the simultaneous occurrence of a white bar signal on line 102, a carry=0 signal and 0 outputs from comparators 78 and 108.

Referring to FIG. 10, these conditions are satisfied only in the narrow range of B1/B2 values defined by a triangular area 130. In a P-type scan, the normalized width of a valid numeric character is equal to seven. In a P-type scan, the B2 signal represents the numeric character. If B2 is equal to seven, then B1 must be between 3.50 and 4.67 in order to satisfy the conditions defined by the triangular area 130. As discussed earlier with reference to quad input And gate 84, this range is centered on the optimum 4.0 normalized width of the four-element center character utilized in practicing the invention.

The outputs of And gates 84 and 88 are combined in a single OR gate 132.

The circuits and tests described above are sufficient for recognizing label candidates when a scan line crosses both a margin character and a center character. In accordance with the present invention, labels can be formed from scan lines that cross one or the other of these delimiting characters plus at least four adjacent numeric characters. Identification of suitable configurations, referred to as $\frac{1}{8}$ configurations, requires a special test to determine whether a valid margin character exists adjacent a numeric character. The test compares the width of the margin character with the width of the adjoining numeric character. If the margin character is at least twice as wide as the adjoining numeric character, the test is satisfied. A set of four And gates 111, 113, 115 and 117 is used for the special test.

And gate 111 tests for the proper margin/numeric character relationship during a P-scan in those situations where a count does not overflow system counter 114 or adders 50 and 56. The black signal on line 102, the inverted carry signal on line 72I, the output of comparator 108 on line 106 and the signals on lines 96B and 96D from the overflow register are applied to And gate 111. A valid two-to-one margin to numeric character relationship will exist when the signals on lines 72I, 102 and 106 are high while the signals on lines 96B and 96D are low.

And gate 113 tests for a two-to-one margin to numeric character relationship during an N-scan when neither the system counter 14 nor accumulator circuit adders 50 and 56 has overflowed. And gate 113 receives a white signal on line 102I, overflow register signals on lines 96B and 96D, the carry signal produced on line 72 and the inverted output from comparator 78 on line 77I. The output of And gate 113 will be high if a valid two-to-one relationship exists during an N scan.

And gate 115 tests for the relationship where the system counter or one of the accumulator adder circuits has overflowed during a P-scan. The white signal on line 102 is applied to And gate 115 along with inverted forms of the overflow signals on lines 96A and 96D and the direct form of the overflow signal on line 96B. A valid numeric character (one that does not cause an overflow condition) would be indicated by a low logic level signal on line 96D. A high level signal on line 96B indicates that the combination of the three guard character modules and the first space in the first numeric character were not so large as to cause an overflow condition. A low level signal on line 96A indicates that an overflow condition exists for the combination of the margin and guard characters. By inference, these signal states will exist only where the margin itself is so large as to cause the overflow condition. Under those conditions, the margin/guard character combination will clearly be at least twice as great as the first numeric character.

And gate 117 is used to test for a two-to-one relationship during an N scan, when the system counter or one of the accumulator adders has overflowed. During an N-scan, an overwidth margin adjacent a valid guard character and a valid numeric character, will cause a high level signal on line 96D. The signal on line 96C, representing the combination of the two bars and one space in the guard character plus the adjacent space of the data character will be low, indicating no overflow condition at that point in the shift register. Similarly, the signal on line 96B representing the data character will be low indicating no overflow.

The output of the And gates 111, 113, 115 and 117 are combined in a single OR gate 119. The high level signal on the output FS of gate 119 indicates that a two-to-one margin/data character relationship has been found.

Figure 11:
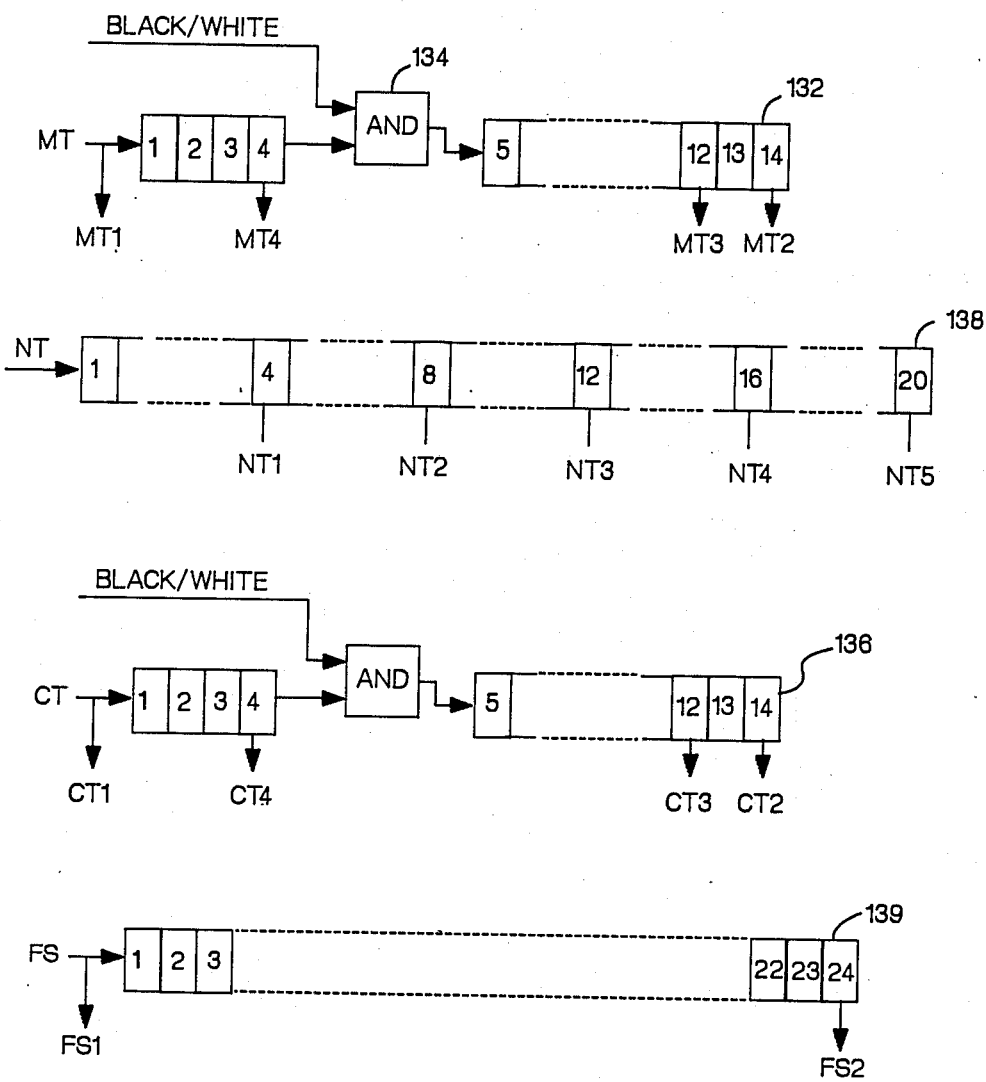
FIG. 11 is a schematic diagram of storage registers connected to the outputs from the circuit shown in FIG. 9.

When a label is scanned, the data is examined for ½ label configuration (margin through center) at any one time. A half label will consist of 32 sequential pulses on which 25 tests must be performed in order to determine whether a valid ½ label candidate exists. FIG. 11 is a schematic diagram, including registers 132, 136, 138, which are used to store the results of all 25 tests. The output MT of OR gate 106 is connected to the first stage of a split shift register 132. An MT1 tap exists at the OR gate output. The results of both P and N scan tests are shifted in series through the first four stages of the split shift register. The output of the fourth stage is applied to an And gate 134, a second input to which is provided by the black/white signal line 102 (FIG. 9). The And gate 134 is enabled upon occurrence of each black signal to pass the results of N-scan tests only. The results of P-type scan tests are lost at this point in the shift register. The loss of the P-type scan test data is unimportant since a valid margin test can occur only at the end of a P-type scan. A valid margin test for an N-type scan would be indicated by a binary 1 at stage 14 of the split shift register 132; that is, at the MT2 line. Two other taps (MT3 at stage 12 and MT4 at stage 4) are used in detecting ½ label configurations in a manner to be described later.

An identical shift register 136 is used to store the results of center character tests. For a P-type scan, the center character test would be the first test to be performed by circuitry associated OR gate 132 and thus the oldest test to be stored in the register 136. A binary 1 at the CT2 tap at stage 14 of register 136 would indicate, a valid center character test during a P-type scan. Conversely, a binary 1 at the CT1 tap indicates a valid center character test for an N-type scan. Two other taps in shift register 136 (CT3 at stage 12 and CT4 at stage 4) are used in detecting ½ label configurations.

The results of both P-type and N-type scans must be stored for potential numeric characters. These test results are stored in a conventional serial shift register 138 having 20 stages. Every fourth stage contains a numeric test tap. In practice, the presence or absence of successful numeric tests are indicated by tests 5, 9, 13, 17 and 21 of a 32 pulse data stream. The first test is considered to be "stored" directly at the output of comparator 74 so that the result of test 5 is actually stored in register stage 4, the result of test 9 is actually stored in register stage 8, etc.

A conventional 24-stage serial shift register 139 is employed to store the results of the 2/1 margin/numeric character test performed by the And gates 111, 113, 115 and 117 shown in FIG. 9. Taps FS2 at the 24th stage of the shift register 139 and FS1 at the input to the first stage provide the results of the oldest and newest tests, respectively, performed in those And gates.

Figure 12:
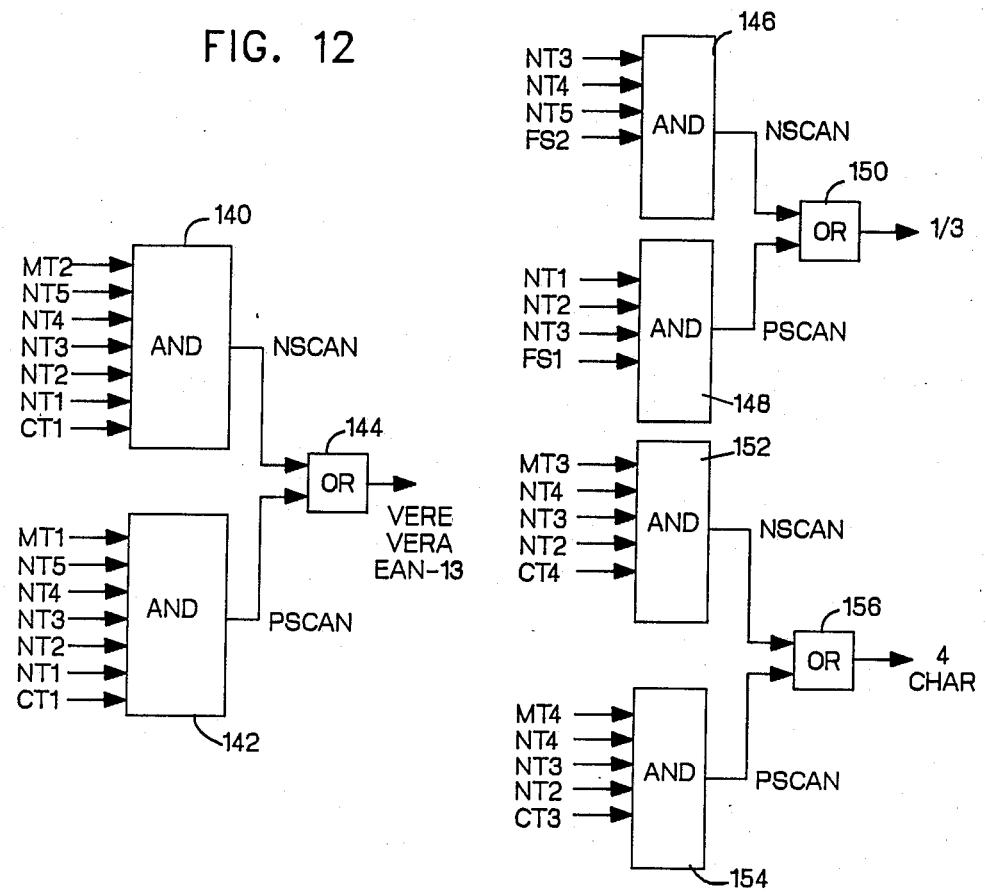
FIG. 12 is a schematic diagram of decoding elements connected to the outputs of the storage registers shown in FIG. 11.

Signals appearing on the various taps for registers 132, 136, 138 and 139 are logically combined in the number of And gates schematically illustrated in FIG. 12 to provide signals or flags identifying various types of data configurations that appear to be contained in the data stream.

Specifically, signals provided at the tap MT2 in register 132, the tap CT1 in register 136 and the taps NT1 throughout NT5 in register 138 are applied to an And gate 140. And gate 140 will produce a high level output only when the various signals at its inputs indicate that a scan line has traversed a complete UPC-E label or at least ½ of a UPC-A or an EAN-13 label in an N-scan mode; that is, crossing through the margin region, through six numeric characters and the center character. And gate 142 will similarly produce a high level or binary 1 output for a P-scan of a complete UPC-E label or at least ½ of a UPC-A or EAN-13 label candidate. The outputs of And gate 140 and 142 are combined in an OR gate 144 which provides a flag or frame signal which is applied to the buffer select circuit and is appended to the data stream entering multiplexer 16 to define the location of the label frame.

FIG. 12 also shows the And gates which are used to detect two additional data configurations; namely, ¼ label configurations and four character configurations. Four character configurations may result either from a scan crossing at least ½ of an EAN-8 label or an incomplete scan of part of a UPC-E, UPC-A or EAN-13 label. The signals appearing on taps NT3, NT4 and NT5 of register 138 and on tap FS2 of register 139 are applied to And gate 146. And gate 146 will provide a high level or binary 1 output signal whenever four adjacent numeric characters have been preceded by a margin candidate satisfying the two-to-one margin/numeric character test performed in the logic circuitry discussed with reference to FIG. 9. And gate 148 will similarly produce a binary 1 output if four adjacent numeric characters are followed by a two-to-one margin/numeric characters candidate. The outputs of And gates 146 and 148 are combined in an OR gate 150 which provides a ¼ signal flag. This signal is applied to the buffer select circuit 30 and is appended to the data stream entering multiplexer 16.

Tests for 4 character configurations are performed in And gates 152 and 154 for N-scan and P-scan conditions, respectively. The And gates 152 and 154 will produce binary 1 output signals only if four adjacent numeric characters have been found to be bounded by what appear to be margin and center characters. The outputs of And gates 152 and 154 are logically combined in an OR gate 156 which provides a four character configuration flag which is appended to the data stream entering multiplexer 16.

The output of OR gate 156 is a flag which at least nominally identifies data configurations representing ½ of an EAN-8 label; that is, center and guard characters with four interposed numeric characters. Under certain scan conditions, a scan of a portion of a UPC-E, UPC-A or EAN-13 label may yield a data configuration which look like ½ of an EAN-8 label but is actually part of the longer label. This ambiguity is explained with reference to FIG. 13. An EAN-8 label 162 includes a center character C and guard character G with a left set 176 of numeric characters and a right set 178 of numeric characters. Scan line 172 would produce a valid four character data configuration since the scan line traverse the guard character, the four numeric characters in set 176 and the center character C. Scan 174 similarly would produce a valid four character data configuration as the scan line traverses the center character C, the four numeric characters in the set 178 and the guard character G at the right edge of the symbol.

Symbol 160 represents a complete UPC-E label or one half of a UPC-A or EAN-13 label. If such a label were traversed by scan line 164, the resulting data configuration would clearly be a ½ label configuration since no center character would have been identified. Data resulting from scan line 166, however, might appear to be a four character configuration since the scan line which partially crosses a numeric character might produce signals which initially appear to represent a margin region on a label.

Figure 14:
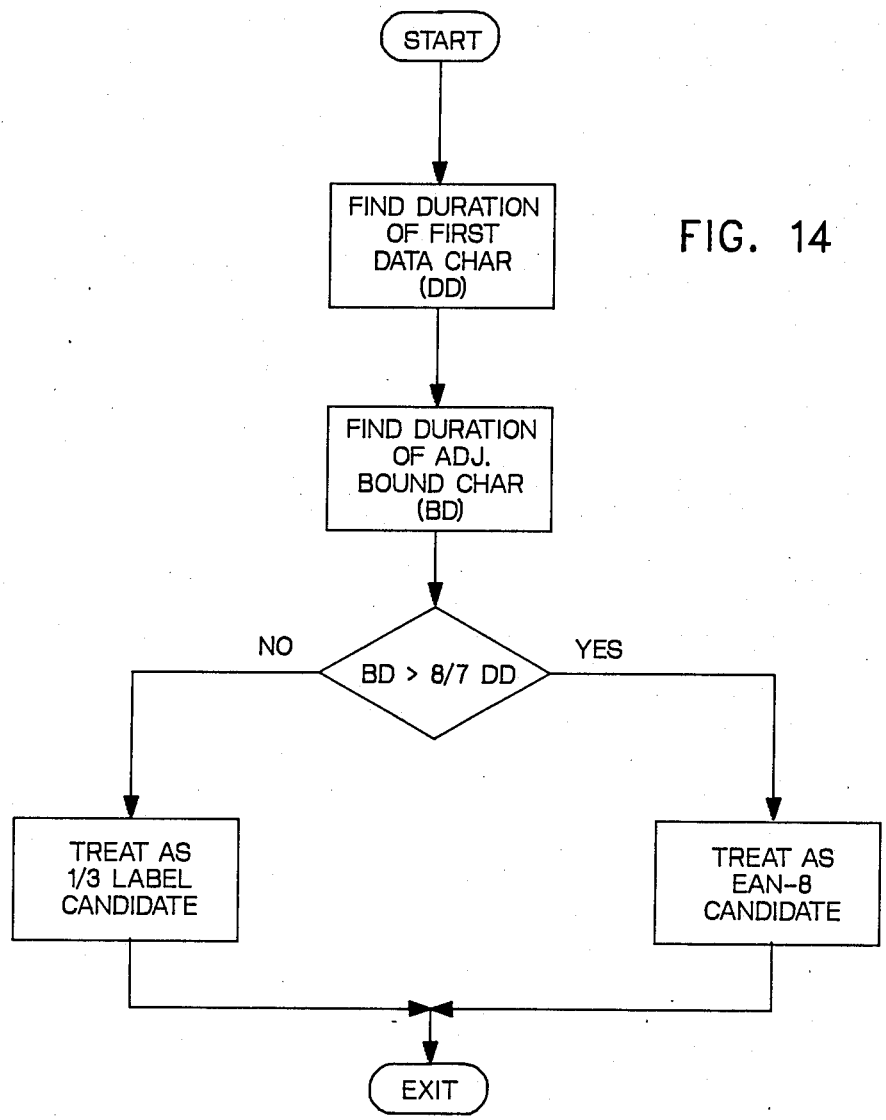
FIG. 14 is a flow chart of a process which is performed to distinguish between two possible types of data configurations once predetermined relationships between adjoining characters have been found to exist.

To determine whether data initially identified as four character configuration actually represents at least ½ of an EAN-8 label or some lesser part of a UPC-E, UPC-A or EAN-13 label, a test is performed in processor 28 on each configuration identified by a four character candidate flag. This test is described with reference to FIG. 14. From the standard definition of a valid margin/guard character combination, it is known that a valid margin/guard character region must be at least eight modules in width while an adjoining numeric character is only seven modules in width. To determine whether what appears to be a margin/guard character region in a four character configuration is actually that or only a part of a numeric character, the duration or width DD of the first numeric character in the four character configuration is found. The duration or width BD of the adjoining "boundary" character is also found. If the width BD of the boundary character is greater than 8/7 the width DD of the adjoining data character, indicating that the boundary character is actually a margin/guard character combination, the four character configuration is identified as representing ½ of an EAN-8 label. Otherwise, the four character candidate is treated as representing part of a UPC-E, UPC-A or EAN-13 label.

Figures 15, 16:
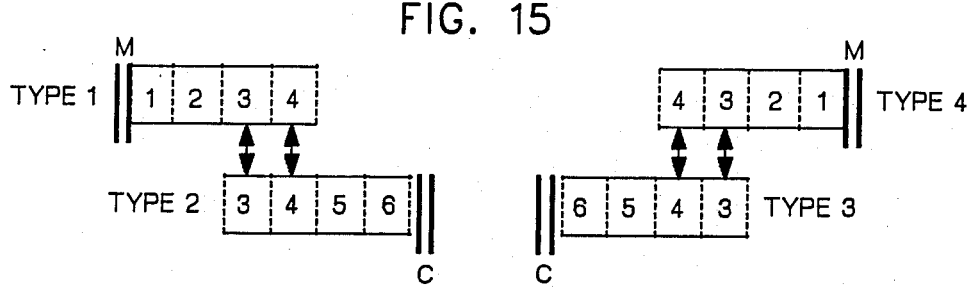
FIG. 15 is a schematic diagram of four possible types of data configurations which can result from partial scans of bar code labels.
FIG. 16 is a parity table which can be used to determine which of the four types of configuraitons shown in FIG. 15 is represented by a given set of data.

Referring to FIG. 15, ½ label configurations consist of four different types of character configurations. Types 1 and 4 consist of a margin character adjacent four numeric characters. Types 2 and 3 consist of a center character adjacent four numeric characters. In processing ½ label configurations, the parity of each of the numeric characters in a candidate is checked to determine whether it conforms to acceptable parity patterns. If the parity pattern for an apparent ½ label configuration does not match acceptable parity patterns, the data is discarded. Referring to the table at the left side of FIG. 16, acceptable parity patterns for ½ label configurations of types 1 and 4 are shown. It will be noted that all numeric characters in a type 4 configuration have even parity. Therefore, a configuration with that parity pattern will be identified as occurring in the right half of a UPC-A or EAN-13 label while characters satisfying any of the other parity patterns will be identified as occurring at the left half of such a label.

The same type of parity pattern checking can be performed to validate ½ label configurations of type 2 or type 3. Again, it will be noted that a type 3 configuration must have numeric characters with even parity.

Figure 17:
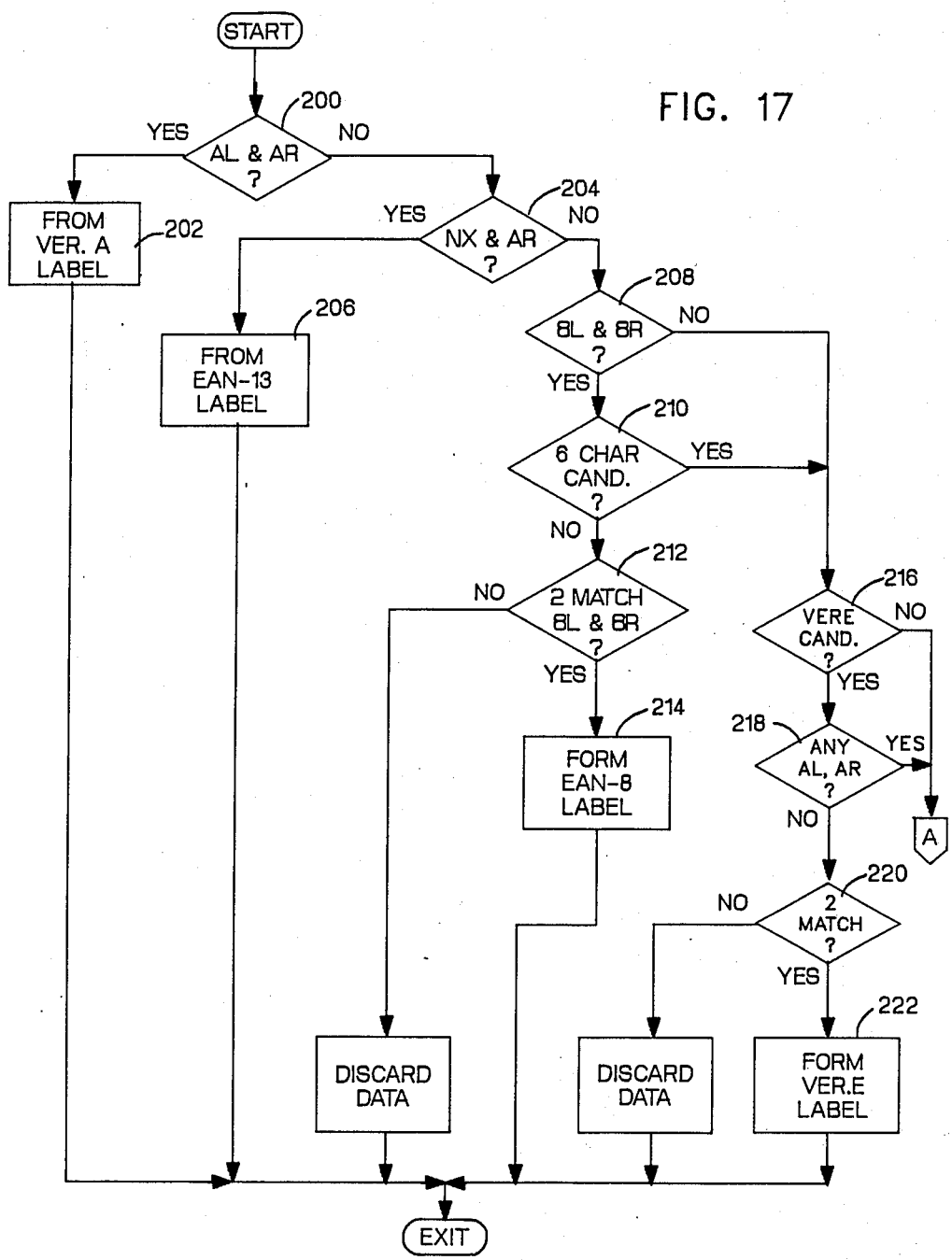
FIGS. 17 and 18, taken together, is a flow chart of the steps that are performed in forming a complete label from incomplete data configurations.
Figure 18:
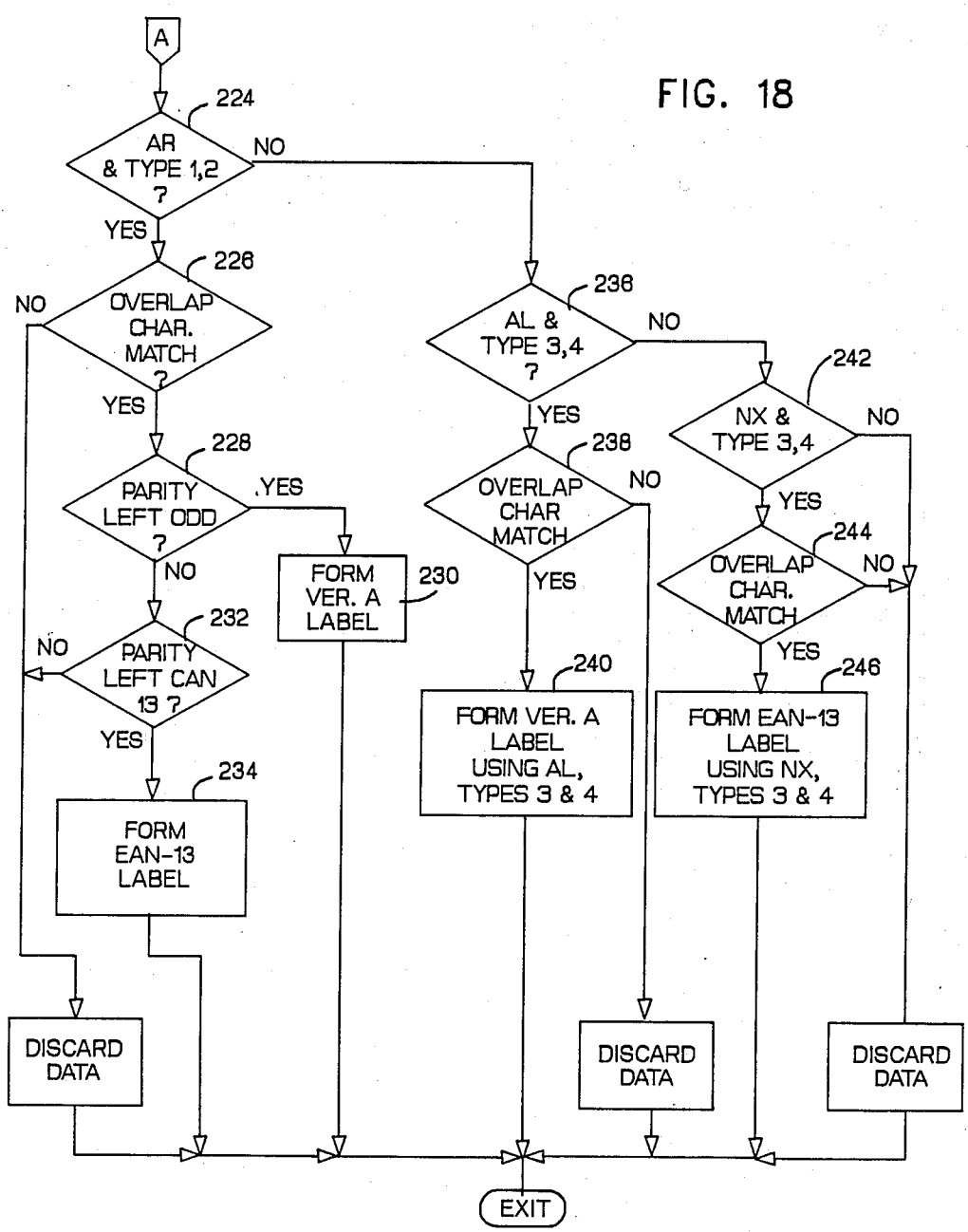

As a result of each scan attempt, processor 28 may receive configurations identified by half label flags, four character flags and ½ label flags. The process employed within processor 28 for forming a complete symbol from two or more such configurations is described by reference to the flow charts shown in FIG. 17 and 18, taken together. The flow chart employs a number of abbreviated terms representing what have been referred to as half-label, ½-label and four character configurations. These terms are set forth in the following table along with their meanings.

| Term | Definition of Terms<br>Data Configuration |
|---|---|
| AL | UPC-E or Left ½ UPC-A |
| AR | UPC-E or Right ½ UPC-A or EAN-13 |
| NX | Left ½ EAN-13 |
| 8L | Left ½ EAN-8 (4 char.) |
| 8R | Right ½ EAN-8 (4 char.) |
| Type 1 | Left ¼ w/Guard |
| Type 2 | Left ¼ w/Center |
| Type 3 | Right ¼ w/Center |
| Type 4 | Right ¼ w/Guard |

In the first operation of the label formation process, (block 200) a check is made to determine whether the processed data includes both AL and AR configurations. If both types of configurations are found, a version A label is formed (block 202) and the assembly routine is exited. If the processed data does not include AL and AR configurations, another check (block 204) is made to determine whether they include NX and AR configurations. If so, an EAN-13 label is formed (block 206) from this combination. If not, a check (block 208) is made to determine whether the data includes 8L and 8R configurations. If 8L and 8R configurations are found, a further check (block 210) must be made to determine whether any detected configurations indicate the existence of a longer (UPC-A, UPC-E or EAN-13) label. If there is no evidence of a longer label, a check (block 212) is made to determine whether redundant data has been detected for the 8L and 8R configurations. If redundant data has been detected, an EAN-8 label is formed (block 214) and the routine is exited. If redundant data cannot be found, the data is discarded and the routine is exited. A generated error signal would notify the operator that a rescan attempt is required.

If the check made at block 208 indicated that either or both of the 8L and 8R configurations had not been found or if the check in block 210 had indicated the possible existence of a UPC-E, UPC-A or EAN-13 label, a further check 216 would be made to determine whether any of the configurations might have represented a version E label. If the check in block 216 indicated the possible existence of a version E label, a decision would be made whether the retrieved data included either AL or AR configurations. If no configurations of either the AL or AR are found (block 218), a further check is made (block 220) to determine whether redundant data has been located for the detected type of configuration. If redundant data exists, a version E label is formed (block 222) from the redundant data and the routine is exited. If redundant data cannot be found, the routine is exited without a label candidate being formed. An error message would be generated to inform the operator to perform a rescan operation.

If the check performed in block 216 had indicated no evidence of a version E label, a further check (block 224 in FIG. 18) would be made to determine whether the processed data included both an AR configuration and type 1 and type 2 configurations. If the data included these configuration types, a further check would have to be made (block 226) to determine whether the characters common to both the type 1 and type 2 configurations match one another.

This can be better explained by brief reference to FIG. 15. That figure shows that the left half of a UPC-A or EAN-13 label can be formed from type 1 and type 2 configurations. However, to form a valid half label from configurations, numeric characters occupy common character positions in the two configurations must be identical to one another. That is, the numeric characters occupy positions 3 and 4 of a type 1 configuration must be identical to the numeric characters occupying positions 3 and 4 of the type 2 configurations before the two can be combined to form a half label candidate.

Similarly, type 3 and type 4 configurations can be combined only where numeric characters occupy common or overlapping positions are found to be identical.

Referring again to FIG. 18, if the check made in block 226 indicates the overlapping characters do not match, the type 1 and type 2 configurations are discarded and the routine is exited. If the overlapping characters do match, the resulting long label candidate is examined (block 228) to determine whether the parity of each of the numeric characters in the formed half label is odd. If it is, a version A label is formed (block 230) and the routine is exited. If it isn't, the parity pattern for the formed left label matches known parity patterns for the left half EAN-13 labels. If the check performed at block 232 is negative, the data is discarded and the routine is exited without a label being formed. If, however, the parity pattern for the left half matches EAN-13 patterns, an EAN-13 label is formed (block 234) before the routine is exited.

If the check made in block 224 did not reveal the existence of AR, type 1 and type 2 configurations, the program branches to a decision block 236 where a check is made to determine whether the available configurations include AL, type 3 and type 4 configurations. If all of these configurations are found, a further check (block 238) is performed to determine whether the overlapping characters in the type 3 and type 4 configurations match. If they do, a version A label is formed (block 240) using the AL configuration for the left half of the label and a combination of the type 3 and type 4 configurations for the right half of the label.

If the overlapping characters do not match, the routine is exited without a label being formed.

If AL, type 3 and type 4 configurations are not found in operation 236, the data is checked (operation 242) to determine whether it includes NX, type 3 and type 4 configurations. If it doesn't, the routine is exited without a label being formed. If it does, the type 3 and type 4 configurations are examined (block 244) to determine whether the overlapping characters match. If they do, an EAN-13 label is formed (block 246) using the NX configuration for the left half of the label and a combination of the type 3 and type 4 configurations for the right half of the label. If they don't, the routine is exited without a label being formed.

While there has been described what is considered to be a preferred embodiment of the present invention, variations and modifications therein will occur to those skilled in the art once they become acquainted with the basic concepts of the invention. Therefore, it is intended that the appended claims shall be construed to include both the preferred embodiment and all such variations and modifications as fall within the true spirit and scope of the invention.

Having thus described my invention with reference to a preferred embodiment thereof, what I desire to secure by Letters Patent is:

1. For use in reading a label of a type including a plurality of numeric characters bounded by standard delimiter characters, including a margin character and a center character, a method of forming a label using data captured by multiple scans of the label where no scan includes both delimiter characters, said method including the steps of:
    determining whether captured data includes a first data configuration having at least one delimiter character and $(n/2)+1$ numeric characters where n is the number of numeric characters bounded by the delimiter characters;
    determining whether captured data also includes a second data configuration having the other delimiter character and $(n/2)+1$ numeric characters;
    determining whether the numeric characters in the first and second data configurations satisfy predetermined parity requirements;
    comparing the numeric values of characters occupying common positions in the two data configurations; and
    forming a label from the two data configurations only when the numeric characters occupying overlapping positions in the two configurations have the same numeric values and the numeric characters have been found to satisfy the predetermined parity requirements.

2. A method as defined in claim 1 including the additional steps of:
    determining whether captured data also contains a third data configuration including another set of numeric characters bounded by both delimiter characters;
    determining whether the numeric characters in the third data configuration satisfy predetermined parity requirements; and
    combining the label formed by the merger of the first two data configurations with the third data configuration to provide a complete label.

3. For use in reading a bar code label of a type which includes at least one set of numeric characters bounded by standard delimiter characters, including a margin character and a center character, a method of forming a label using data captured by multiple scans of the label where certain scans fail to include both types of delimiter characters, said method comprising the steps of:

examining captured data to determine whether such data includes a first type of data configuration, such configuration having both kinds of delimiter characters and a set of numeric characters;

examining each data configuration of the first type to determine whether the numeric characters meet predetermined parity requirements;

classifying each first type in which the numeric characters meet the predetermined parity requirements as representing a particular portion of a particular kind of bar code label;

examining captured data to determine whether such data includes at least one second type of data configuration, each such configuration having only one delimiter character and a predetermined minimum number of numeric characters;

examining each data configuration of the second type to determine whether the numeric characters meet predetermined parity requirements;

classifying each second type of data configuration as representing a particular portion of a particular kind of bar code label on the basis of the particular delimiter character and the parity of the numeric characters in each such second type;

determining whether there are two second type data configurations representing adjacent portions of a particular kind of label;

comparing the numeric values of characters occupying common positions in each such pair of second type data configurations;

merging each such pair of second type data configurations only when the numeric characters occupying overlapping positions have the same numeric values to form a single data configuration having both kinds of delimiter characters and a single set of numeric characters; and forming a complete label from a given first type of data configuration and a given single data configuration when such configurations have been classified as representing different portions of the same kind of bar code label.

4. A method as defined in claim 3 wherein the different kinds of bar code labels which can be formed include UPC Version A, UPC Version E, EAN-8 and EAN-13 format labels.

5. A method as defined in claim 4 including the steps of:

identifying any first type data configurations representing the left and right sides of a UPC Version A label and forming such a label by the merger of such identified configurations;

if a UPC Version A label cannot be formed from first type data configurations, identifying any first type configurations representing the left and right sides of an EAN-13 label and forming such a label by the merger of such identified configurations;

if an EAN-13 label cannot be formed from first type data configurations, identifying any first type data configurations representing the left and right sides of an EAN-8 label;

examining the processed data to determine whether such data includes configurations indicative of any UPC Version A, UPC Version E or EAN-13 label;

forming an EAN-8 label from the identified first type configurations only if the examined data does not indicate the possible existence of another kind of label;

if an EAN-8 label cannot be formed, testing identified first types of data configurations to determine whether any of such types can be used to form a UPC Version E label and forming such a label only if the identified configurations have been found more than once during a scan session;

if a UPC Version E label cannot be formed, identifying any first type of data configuration classified as representing the right side of an EAN-13 or UPC Version A label and any second types of data configurations representing different portions of the left side of either an EAN-13 or UPC Version A label;

determining whether the identified second types represent either an EAN-13 or a UPC Version A label on the basis of the parity pattern of the numeric characters and forming either a complete EAN-13 or a complete UPC Version A label by the merger of the identified first type and the merger of the identified second types;

if neither an EAN-13 nor a UPC Version A label can be formed, examining the data to identify a first type representing the left side of either a UPC Version A label and any second types representing different portions of the right side of a UPC Version A label;

forming a complete UPC Version A label using the identified first type and a merger of the identified second types;

if a UPC Version A label cannot be formed, examining the data to identify any first type representing the left side of an EAN-13 label and any second types representing different portions of the right side of an EAN-13 label;

forming a complete EAN-13 label using the identified first type and a merger of the identified second types; and discarding all data if a complete label cannot be formed by any of the foregoing steps.

* * * * *